Oct. 12, 1937.   H. I. PIATT   2,095,346
FLOAT VALVE
Filed April 3, 1934   4 Sheets-Sheet 1

INVENTOR
Howard I. Piatt
BY
Samuel H. Davis
ATTORNEY

Oct. 12, 1937.  H. I. PIATT  2,095,346
FLOAT VALVE
Filed April 3, 1934  4 Sheets-Sheet 2

INVENTOR
HOWARD I. PIATT
BY
Samuel H. Davis
ATTORNEY

Oct. 12, 1937.  H. I. PIATT  2,095,346
FLOAT VALVE
Filed April 3, 1934  4 Sheets-Sheet 3
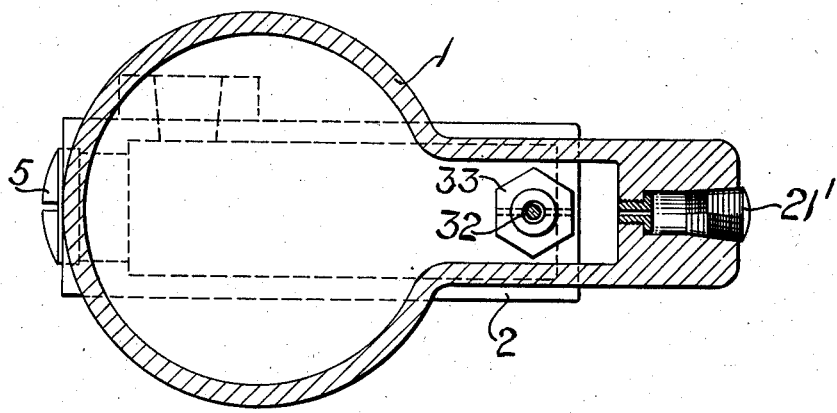
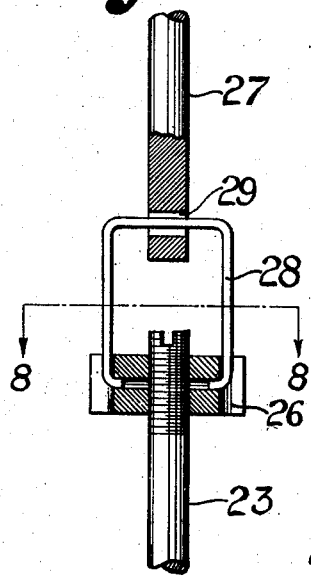
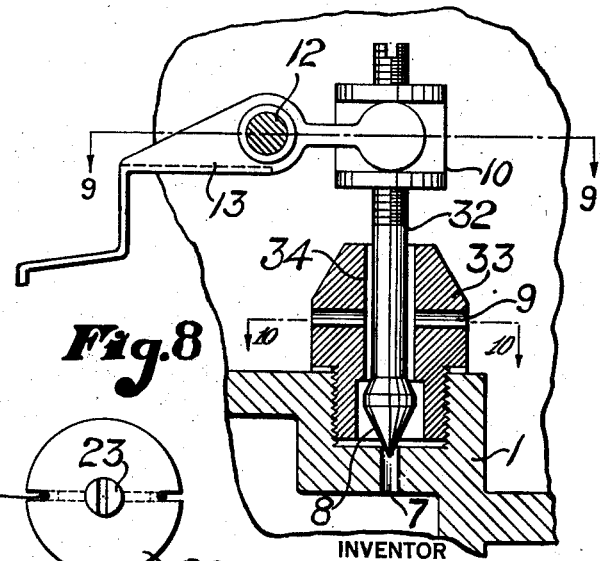
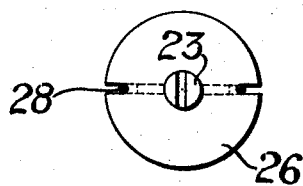
INVENTOR
Howard I. Piatt
BY Samuel H. Davis
ATTORNEY Oct. 12, 1937.  H. I. PIATT  2,095,346
FLOAT VALVE
Filed April 3, 1934   4 Sheets-Sheet 4

INVENTOR
BY Howard I. Piatt
Samuel H. Davis
ATTORNEY

Patented Oct. 12, 1937

2,095,346

UNITED STATES PATENT OFFICE 2,095,346

FLOAT VALVE

Howard L. Piatt, Lansing, Mich.

Application April 3, 1934, Serial No. 718,882

5 Claims. (Cl. 137—68)

This invention relates to a float valve, intended for use in fluid fuel control service in conjunction with gasoline engines, oil burning heaters, or in any connection where a continuous flow of liquid fuel is required.

The object of this invention is the provision of devices having the purpose stated in which an open top float is employed whereby if a piece of refuse material lodges between the float valve and its seat so that the valve will not close, the fluid will continue to rise in the float chamber. The float being allowed but a limited movement due to its connection with the float valve the fluid will rise in the float chamber and flow over the top of the open float and into the float causing the float to fall, when the float descends the float valve which is a double valve, is drawn away from one seat and held upon its second seat. This action causes the fluid to cease flowing, and also acts to flush the dirt or obstruction from the valve seat. It is the object also of this invention to construct devices having special formation and combination by which it is believed the operating objects above outlined are certainly and fully carried out, the essential parts being of simple structure, very strong and durable, and cannot become disarranged in ordinary service.

The special construction and arrangement of the parts of this invention are illustrated in the accompanying drawings forming a part of this application.

Fig. 1 of the drawings represents a top view with the parts assembled.

Fig. 5 is a horizontal section taken on the broken line 5—5 of Fig. 4.

Fig. 6 is a detail view, somewhat enlarged, showing the connection of the outlet operating rod, valve stem and guide head therefor.

Fig. 7 is a detail view in section showing the float lever in connection with the double valve stem, and showing also the apertured nut in the casing between the float chamber and oil receiving chamber.

Fig. 8 is a cross section on the line 8—8 of Fig. 6.

Throughout the drawings and description the same number is used to refer to the same part.

Figure 1:
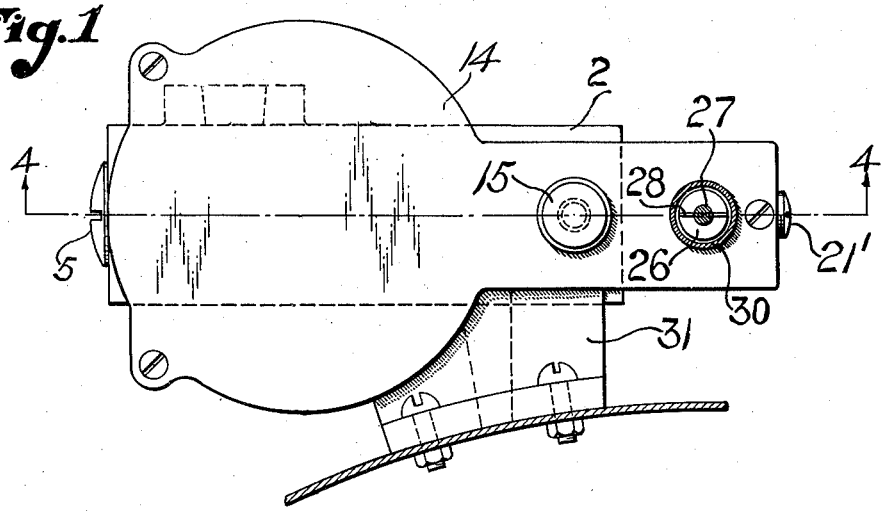

Considering the drawings, a casing 1 of any chosen shape has formed therein an oil receiving chamber or enclosure 2, and a float chamber 3. The receiving chamber has an oil inlet 4, and an end mouth closed by the screw cap 5 by which there may be introduced and withdrawn any filtering material 6.

Figure 4:
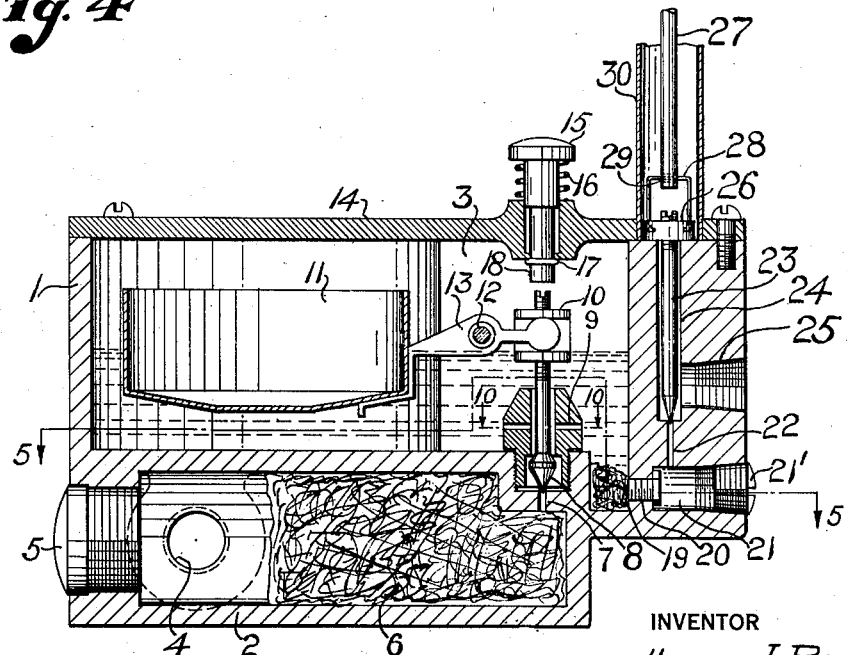
Fig. 4 is a vertical section taken on the broken line 4—4 of Fig. 1 showing all parts assembled.
Figure 9:
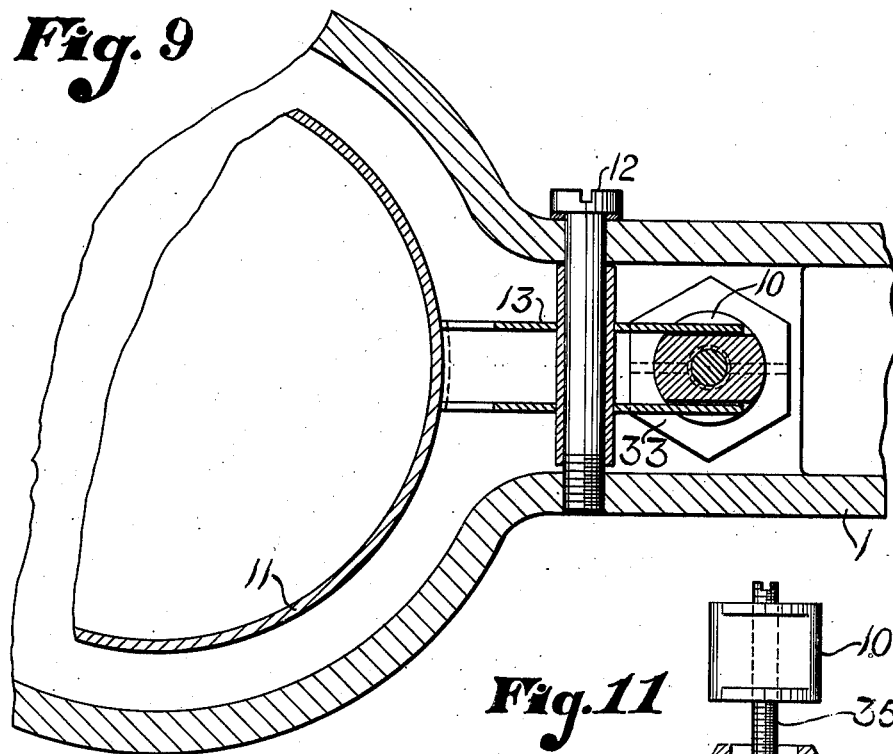
Fig. 9 is an enlarged horizontal part section taken on the broken line 9—9 of Fig. 7, showing the pivotal connection of the casing and float valve lever.

The chamber 2 has a passage 7 controlled by a double valve 8, and the stem of the valve passes upwardly through a nut or the like having an aperture 9 and to be further described. The stem of the double valve is adjustably connected to a winged collar 10, as shown in Figs. 4 and 7, and the double valve is actuated by movements of the open float 11 supported on the pivot bolt 12 in the casing as shown in Fig. 9, by means of the float lever 13. The float chamber is closed by the top 14 of the casing. As best shown in Fig. 4 a push pin 15 having the coil spring 16 about it passes through the top 14 of the casing and is arranged to act directly upon the upper end of the double valve stem. The valve may be moved downwardly by the pin 15. The upward movement of the pin is limited by the collar 17 on the pin within the casing, and the end of the pin that contacts with the double valve stem is marked 18.

Oil passes from the float chamber by way of a pocket having usually a charge of filtering material 19, and through an interchangeable jet tube 20. It will be noted that this tube may be removed or introduced by way of the passage closed by the screw stop 21' as shown in Fig. 4. From the passage 21 a duct 22 leads upwardly and an outlet valve 23 in a vertical channel 24 in the casing controls the duct 22, to regulate the flow of oil from the float chamber to the exterior of the casing and to the apparatus wherein it is to be burned. The apparatus is not shown, but is to be connected with the outlet 25. The upper end of the rod outlet valve 23 is screw-threaded and in adjustable connection with a circular head 26, attached adjustably to an operating rod 27 by means of a yoke 28, the lower end 29 of the rod engaging the yoke. The outlet valve 23 may thus be adjusted, by contact of the head 26 and the casing, and the head is guided by the vertical tube 30 set in the top of the casing.

Figure 2:
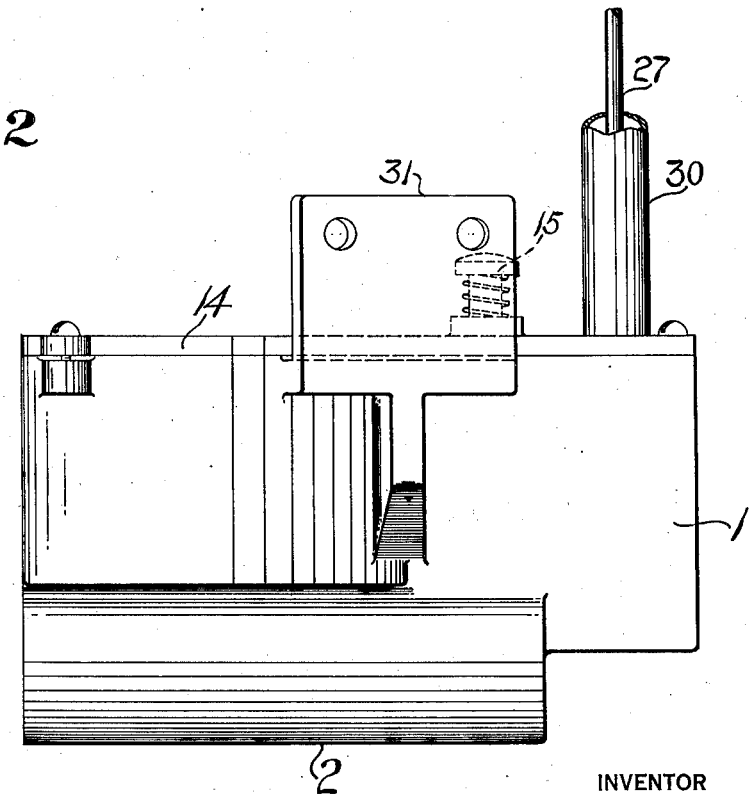
Fig. 2 is a side view of the parts set out in Fig. 1.
Figure 3:
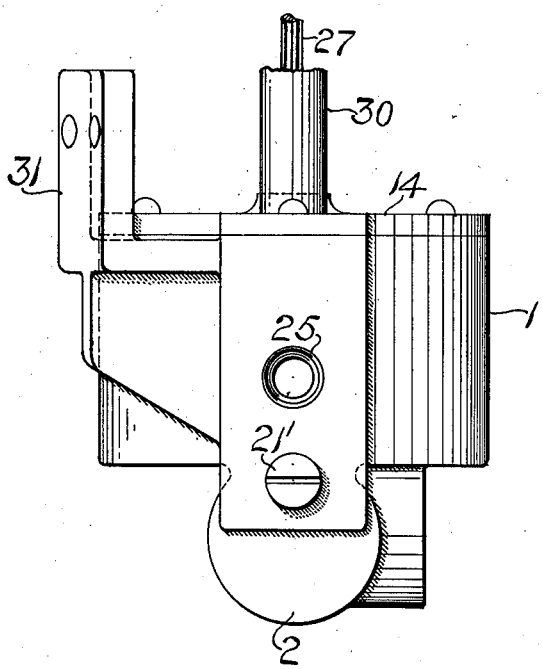
Fig. 3 is an end view of the parts appearing in Fig. 1.

The casing is constructed to be supported as desired by a suitable bracket arm 31 provided with bolt holes as illustrated in Fig. 2.

Figure 11:
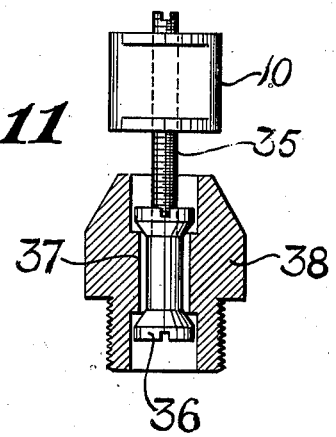
Fig. 11 shows in vertical section a modified form of the apertured nut, and a modified form of the double valve located in the passage through the nut.
Figure 10:
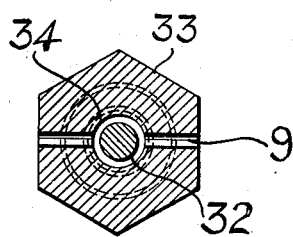
Fig. 10 is a cross section of the apertured nut taken horizontally upon the broken line 10—10 of Fig. 7.

Considering Fig. 7, the apertured nut 33 which has the transverse oil passage 9 allows the stem 32 of the double valve 8 to move up or down in the passage 34 through the nut, and that passage also leads to the float chamber as shown in Fig. 4. It is believed to be illustrated in Fig. 7 that the double valve 8 seats downwardly in the passage 7 through the wall of the chamber 2, and upwardly in the lower end of the passage 34 in the nut 33. If the nut is adjusted up or down in the wall of chamber 2 the distance between the valve seats is changed. By altering the position of the winged collar 10 on the valve stem 32, the position of the open float 11 may be controlled in the casing 1, which will permit the adjustment of the float with respect to the adjustments of the valve seats as stated. In Fig. 11 the valve stem 35 is screw-threaded and engages the spool-shaped valve 36 which is located in the passage 37 of the nut 38. The winged collar 10 is not changed. It will be noted in the Fig. 11 that the passage 37 affords two seats for the valve, and the valve in its opposite movements up or down control those seats alternately.

The operation of the preferred form of the double valve and of the modification are the same. An obstruction in the passage 7 keeps the double valve from its seat, and the oil continues to flow into the float chamber. As the open float cannot now rise, it fills with oil and descends thus causing the upper portion or cone of the double valve to shut off the passage through the apertured nut, and the oil ceases to flow. This movement causes a flushing of the passage 7 and any usual deposit of dirt or sediment is washed out. The float is then emptied of oil and the operation is resumed in the regular manner. This removal of the obstruction is aided by the hand reciprocation of the spring push pin acting upon the double valve stem, as will be readily understood from the drawings.

It is not intended to limit this invention to the precise shapes, sizes or disposition of the parts, as it is believed changes therein would obviously present themselves to persons familiar with this type of oil serving contrivances.

Having now described this invention and the manner of its use, I claim:—

1. In an oil burning apparatus of the character described, the combination of a casing, a passage through the wall of the casing, an apertured nut engaging the wall of the passage, a double valve, the said passage in the wall affording one seat for the valve, the said nut having a passage through it affording a second and opposite seat for the valve, an open float in said casing, a pivoted lever supporting the float, means adjustably connecting said lever and valve and adapted to alter the position of the float when said valve is seated in the nut.

2. In an oil burning apparatus of the character described, the combination of a casing, a passage through the wall of said casing, a nut engaging the wall of said passage, a double valve, said nut having a passage therethrough affording spaced seats for said valve, an open float in said casing, a pivoted lever supporting said float, and an adjustable connection between said lever and valve, said float being normally operable to maintain a substantially constant liquid level in said casing, and during its normal operation being adapted to move said valve against the flow of the liquid through said second passage to close the latter, said float also being operable upon increase of liquid level in said casing above said substantially constant liquid level and above the opening in said float to move said valve in the direction of flow of the liquid through the second passage to close the latter.

3. In a float actuated control device, the combination of a chamber, means forming a liquid inlet passageway to said chamber having oppositely facing valve seats, a valve member having oppositely facing valve portions engageable with said seats, and a float having an opening in its top portion within said chamber and operatively connected to said valve member for moving the same in a direction opposite to the flow of liquid to engage one of said valve portions with one of said seats to normally maintain a substantially constant level of liquid within said chamber and for also moving said valve member in the direction of flow of liquid to engage the other of said valve portions with the other of said seats when the level reaches a predetermined height above said substantially constant level and overflows into said float to overcome its buoyancy.

4. A float actuated control device comprising a hollow casing having an inlet and an outlet, said inlet having spaced valve seats, a movable double valve for controlling said inlet, said valve having a valve portion adapted to engage each valve seat at each limit of the movement of said valve to close the inlet and also adapted to clear each valve seat intermediate the limits of the movement of said valve to open the inlet, and a float having an opening in its top portion within said casing and having a limited upward movement, said float being operatively connected to said valve and adapted to normally move said valve against the flow of liquid through said inlet to engage one of said valve portions with one of said valve seats and thereby close said inlet, said float also being adapted to normally move said valve in the opposite direction to a position intermediate the limits of movement of said valve to thereby open the inlet, whereby said float acting upon said valve normally maintains a substantially constant liquid level in said casing, said float also being operable upon failure of said valve under normal operation of said float and consequent increase of liquid level in said casing above said substantially constant liquid level, whereby liquid fills said float and the latter moves downwardly, the connection between said float and valve at this time providing for movement of the valve in the direction of flow of the liquid through said inlet to engage the other of said valve portions with the other of said valve seats and to thereby close the inlet.

5. A float actuated control device comprising a hollow casing having an inlet and an outlet, said inlet having spaced valve seats, a movable double valve for controlling said inlet, said valve having a valve portion adapted to engage each valve seat at each limit of the movement of said valve to close the inlet and also adapted to clear each valve seat intermediate the limits of the movement of said valve to open the inlet, and a float having an opening in its top portion within said casing and operatively connected to said valve and normally operable through said valve to maintain a substantially constant liquid level in said casing, said float also being operable upon failure of said valve under normal operation of said float and consequent increase of liquid level in said casing above said substantially constant liquid level and above the opening in the float to move said valve in the direction of flow of the liquid through said inlet to close the latter.

HOWARD I. PIATT.